(12) United States Patent
Sander, Jr. et al.

(10) Patent No.: US 8,191,278 B2
(45) Date of Patent: Jun. 5, 2012

(54) HINGED TAPE MEASURE

(76) Inventors: Frank Scott Sander, Jr., N. Las Vegas, NV (US); Daniel Scott Hagan, Pahrump, NV (US)

( * ) Notice: Subject to any disclaimer, the term of this patent is extended or adjusted under 35 U.S.C. 154(b) by 127 days.

(21) Appl. No.: 12/807,102

(22) Filed: Aug. 27, 2010

(65) Prior Publication Data

US 2012/0047758 A1 Mar. 1, 2012

(51) Int. Cl.
*G01B 3/10* (2006.01)
(52) U.S. Cl. ........... 33/759; 33/757; 33/770; 33/768
(58) Field of Classification Search .......... 33/755, 33/757, 759, 768–771, 458, 483, 484, 489, 33/491, 493, 495–500
See application file for complete search history.

(56) References Cited

U.S. PATENT DOCUMENTS

| | | | | |
|---|---|---|---|---|
| 745,243 A * | 11/1903 | Saxton et al. | ............ | 403/93 |
| 759,313 A * | 5/1904 | Roe | ............ | 33/1 N |
| 1,114,658 A * | 10/1914 | Watters | ............ | 33/16 |
| 1,994,339 A * | 3/1935 | Farrand | ............ | 33/768 |
| 2,005,850 A * | 6/1935 | Witchger | ............ | 33/770 |
| 2,063,422 A * | 12/1936 | Farrand | ............ | 33/768 |
| 2,646,940 A * | 7/1953 | Volz | ............ | 242/375 |
| 2,797,489 A * | 7/1957 | Roe | ............ | 33/709 |
| 2,956,795 A | 10/1960 | Foster | | |
| 3,039,197 A * | 6/1962 | Abbott | ............ | 33/456 |
| 3,087,251 A * | 4/1963 | Betz | ............ | 33/766 |
| 3,164,907 A | 1/1965 | Quenot | | |
| 4,160,324 A * | 7/1979 | Dunn | ............ | 33/759 |
| 4,773,503 A * | 9/1988 | Purkapile | ............ | 182/22 |
| 5,231,769 A | 8/1993 | Mahan | | |
| 6,324,769 B1 * | 12/2001 | Murray | ............ | 33/755 |
| 7,111,408 B2 | 9/2006 | Critelli et al. | | |
| 7,228,644 B1 | 6/2007 | Hellem et al. | | |
| 7,490,414 B2 | 2/2009 | Critelli et al. | | |
| 2003/0000096 A1 * | 1/2003 | Wang | ............ | 33/458 |

OTHER PUBLICATIONS

Internet access: Nextag, Stanley-Bostitch, Pro-Mark.
Internet: Klein Tools.com has a tape measure with a 9 foot "stand out".

\* cited by examiner

*Primary Examiner* — Amy Cohen Johnson (57) ABSTRACT

A combination of a retractable tape measure assembly with folding front section (s) includes a housing assembly and a reel rotatably mounted in the housing assembly. An elongated blade formed of a ribbon of metal having one end connected to the reel is constructed and arranged with respect to the housing assembly to extend from a position tangential to the reel outwardly through a spaced opening in the housing assembly. A coil spring formed of a ribbon of metal and pivoting front section (s) made of same metal has a construction and arrangement between the housing assembly and the reel and at the pivot points to rotate the reel in the housing assembly smoothly in a direction to wind up the elongated blade when extending outwardly of the housing assembly opening in a normal concavo-convex cross-section configuration onto the reel. A blade holding assembly is constructed and arranged to be manually actuated to hold the blade in any position of extension. The blade with, thickness, height of concavo-convex curvature sufficient to enable the blade to stand out. The pivot points of these sections comprises a holding system to lock a desired angle between sections with addition of a wedge pinch pressure adding a greater hold on the pivot point.

3 Claims, 11 Drawing Sheets

HINGED TAPE MEASURE

BACKGROUND OF THE INVENTION

This invention relates to tape measures, specifically to a hinges system for a retractable steel tape measure. The hinges allow out of reach horizontal measurements.

BACKGROUND

Prior Art

Originally, tape measures and folding rulers have gone through changes to increase convenience and efficiency. Stronger tape material have increased the "stand out". Stand out is the ability of the tape to support itself as it is held in the horizontal position. Attachments to the tape measure have also added convenience. However, none of these changes or additions approach solving the challenge of accomplishing out of reach horizontal measurements.

U.S. Pat. No. 2,956,795 to E. E. Foster, 1960 Oct. 18, controlled recoil speed by increasing or decreasing the cross curve of the steel tape measure. This cross curvature and metal thickness also gives the steel tape the ability to self support in the horizontal position and out of the tape measure housing for a plurality of feet.

U.S. Pat. No. 7,490,414 to Critelli, et al., 2009 Feb. 17, increased this ability of the tape to support itself horizontally for a distance out of the housing of the tape measure, often called stand out. By increasing the thickness of the steel and controlling the cross curvature inventors have been able to increase this stand out distance. This is a convenience that many people, that measure, look for in a tape measure. And is for taking a horizontal measurement as far as a person can reach above or below themselves with the tape measure.

However, the challenge of out of reach horizontal measuring has not been met by this increased horizontal self-support and or stand-out. The challenge of out of reach horizontal tape measuring has been solved in the past by using a ladder. Although using a ladder in some situations is bulky and slow. Out of reach may be over head or below ground level, for example an elevator shaft.

Another example of trying to solve this challenge is a stab and press the tape method. This method will get a tape measurement horizontally with out climbing up or down a ladder. The user must extend the tape to a corner of the wall and ceiling and apply steady pressure. Applying steady pressure the user bends the tape measure and runs it horizontally across the ceiling or the bottom of an elevator pit. The tape will not self support itself over head and the slightest change in pressure against the corner and ceiling and the tape will fall down at the bend in the tape. A disadvantage of the toughest of the tape measures is the tape has no self supporting strength after the steel tape is bent anywhere along its length.

Folding rulers may approach this challenge to a limited degree. Rulers can be folded out in a shape to measure out of reach horizontally. Although, folding rulers are usually shorter in length, around 12 feet and slower to fold and unfold than a tape measure. They are made shorter because they become bulky when folded up if made any longer. Most people that measure use a tape measure because it comes in longer lengths, around 25 to 30 feet and reels in and out quickly. Using a folding ruler is effective only a short distance out of reach and will self support itself. Folding rulers do approach the challenge but are limited in length, size, and speed at which you can fold out and fold in the ruler.

U.S. Pat. No. 7,111,408 to Critelli, et al., 2006 Sep. 26, shows a multiple angle hold at each fold. This makes taking measurements from different positions and for a short distance out of reach possible. Approaching the challenge but not solving it for today's world of tape measure convenience.

Different attachments have been added to tape measures to increase efficiency and convenience. U.S. Pat. No. 5,231,769 to Mahan, 1993 Aug. 3, adds a tip for a more accurate measure of roof shingles. This patent shows how tape measure improvements have become specialized. Again, this and all the other changes to tapes and rulers have not completely approached the out of reach horizontal measurement challenge.

U.S. Pat. No. 7,228,644 to Hellem, et al., 2007 Jun. 12, adds a carpenter's square to the bottom of a tape measure for increased tape measure efficiency. However, the challenge of convenient out of reach measuring is not solved by this addition.

U.S. Pat. No. 3,164,907 to Quenot, 1965 Jan. 1, adds a locking device to stop the tape in any position for measurement. Although a helpful step, it does not completely solve the challenge of convenient out of reach horizontal measuring.

In prior art, the challenge of a tape measure that is convenient in measuring several feet out of reach has not been approached. Many conveniences and efficient changes and additions have taken place to the tape measure. These patents show how tape measure improvements have become specialized. Prior art has not approached the specific task of convenient out of reach horizontal measuring with a tape measure. Sometimes for example, many areas up and along a high ceiling need to be measured for required inspections. Carrying and using a ladder for out reach measurements is bulky and slow. A self supporting tape measure solution is needed for out of reach horizontal measuring situations.

OBJECTS AND ADVANTAGES

Accordingly, several object and advantages of our invention are the hinges area on the tape measure. When the hinged areas are straightened our tape measure invention reels in like normal. The hinged or pivotable areas allow for a horizontal measurement to be taken many feet out of reach. For example measuring something horizontally, along the surface of a 10 foot high ceiling, while still standing on the floor. With the addition of pivoting sections the tape measure becomes horizontally self supporting many feet out of reach.

Another object and advantage is the ability of the hinged areas to be set at different angles. These pivoted areas may be set at any angle so you may horizontally measure something standing in different places. Another advantage is a locking system for the pivot or hinge to better hold the angle needed. Another object is a pinch system working with the lock that holds two pivot sections together for added horizontal length. With this pinch and lock system enabling a balanced tee shape for longer length challenges.

Another object or advantage of our invention of hinges in a tape measure is that it will combine with other improvements and additions being used today. Further objects and advantages of our invention will become apparent from a consideration of the drawings and ensuing description.

SUMMARY

Our invention is a tape measure that is self supporting when measuring horizontally many feet out of reach. This advantage is achieved with hinges along the length of the tape.

These hinges or pivots added will allow for a sections of the tape measure to be moved and set at an angles. In one of the embodiments the pivots may be set and locked in an angles. Also, another embodiment has a pinch across from the lock to hold together two sections of tape. Taking measurements with our tape measure invention improves safety, efficiency and convenience. A tape measure with our invention of hinges along length of the tape will save time. Saving time saves money.

DRAWINGS LIST OF REFERENCE NUMERALS 12 front tip
14 tip measure
16 pivot
18 back tip
20 *a* angle hold
20 *b* angle hold
22 base measure
24 housing
26 lock lever
27 wedge
28 bolt
30 *a* washer
30 *b* washer
32 rivet cap
34 pinch

DETAILED DESCRIPTION

Figure 1:
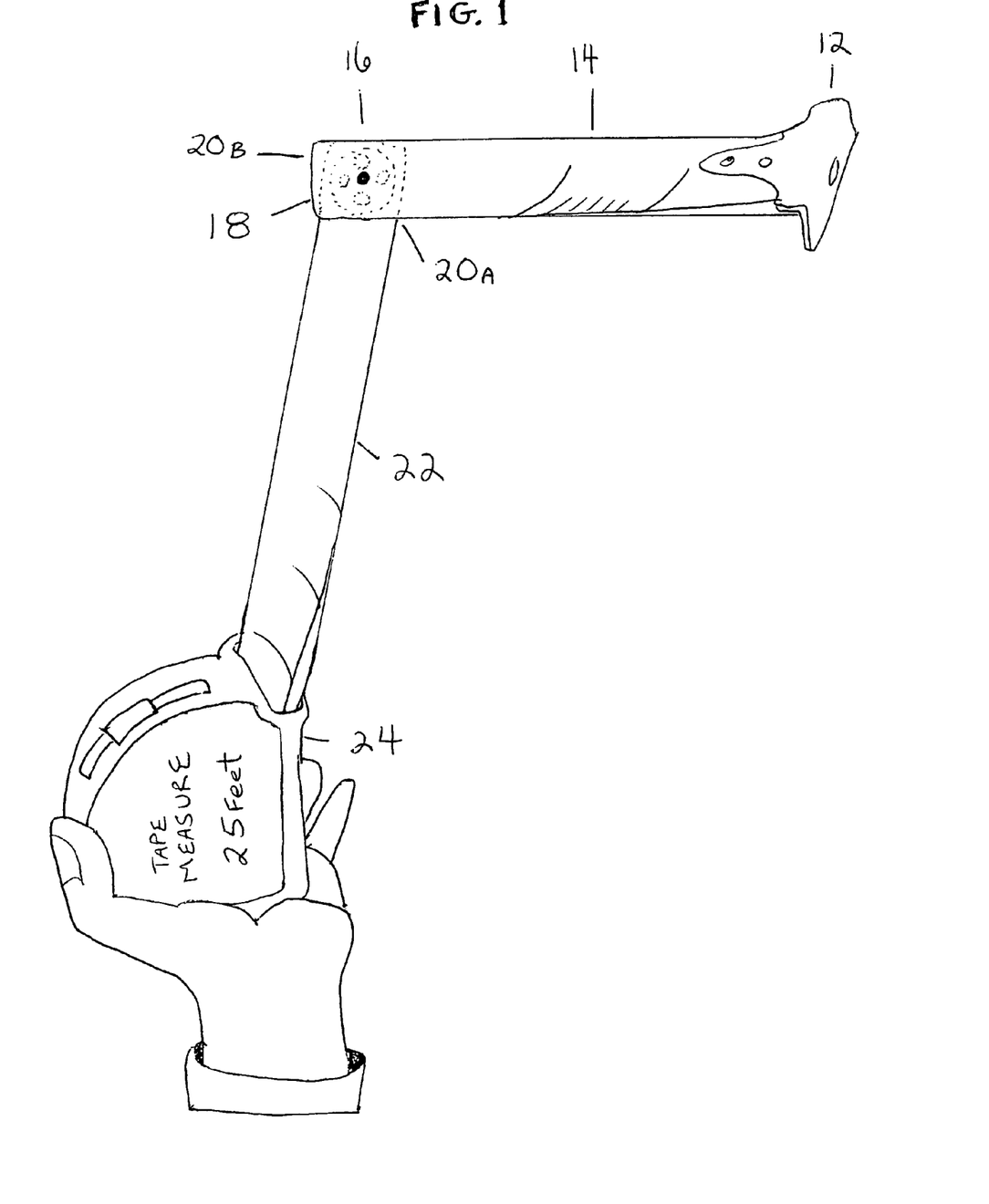
FIG. 1 is a upward looking perspective view showing the tape measure housing 24 being held for an overhead measurement. Angle Hold 20 attached around pivot 16 keeps in place an obtuse angle for horizontal measurement accuracy.
Figure 2:
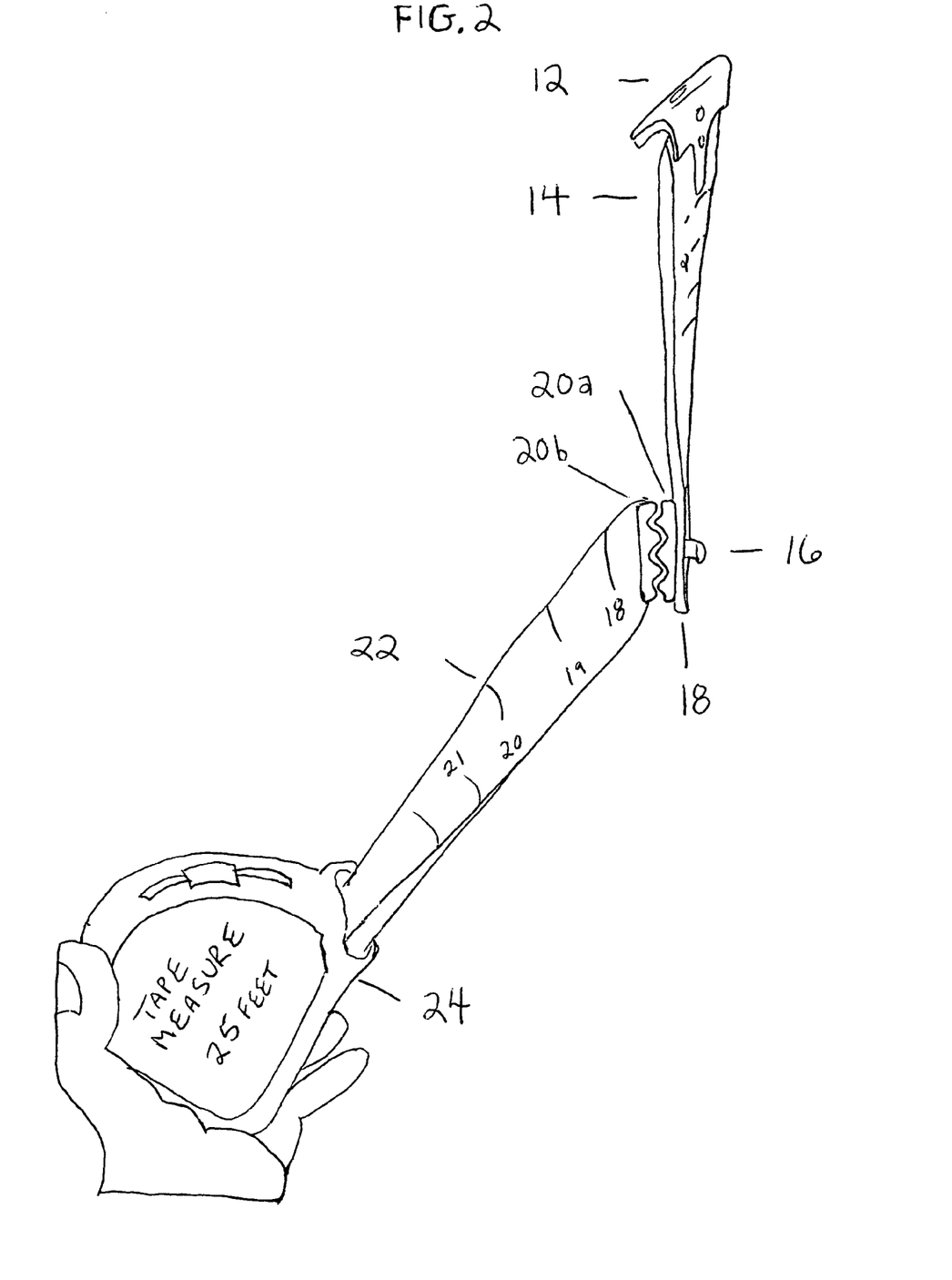
FIG. 2 is perspective of the tape twisted showing back and pivot 16 with angle hold 20 exposed to view.
Figure 3:
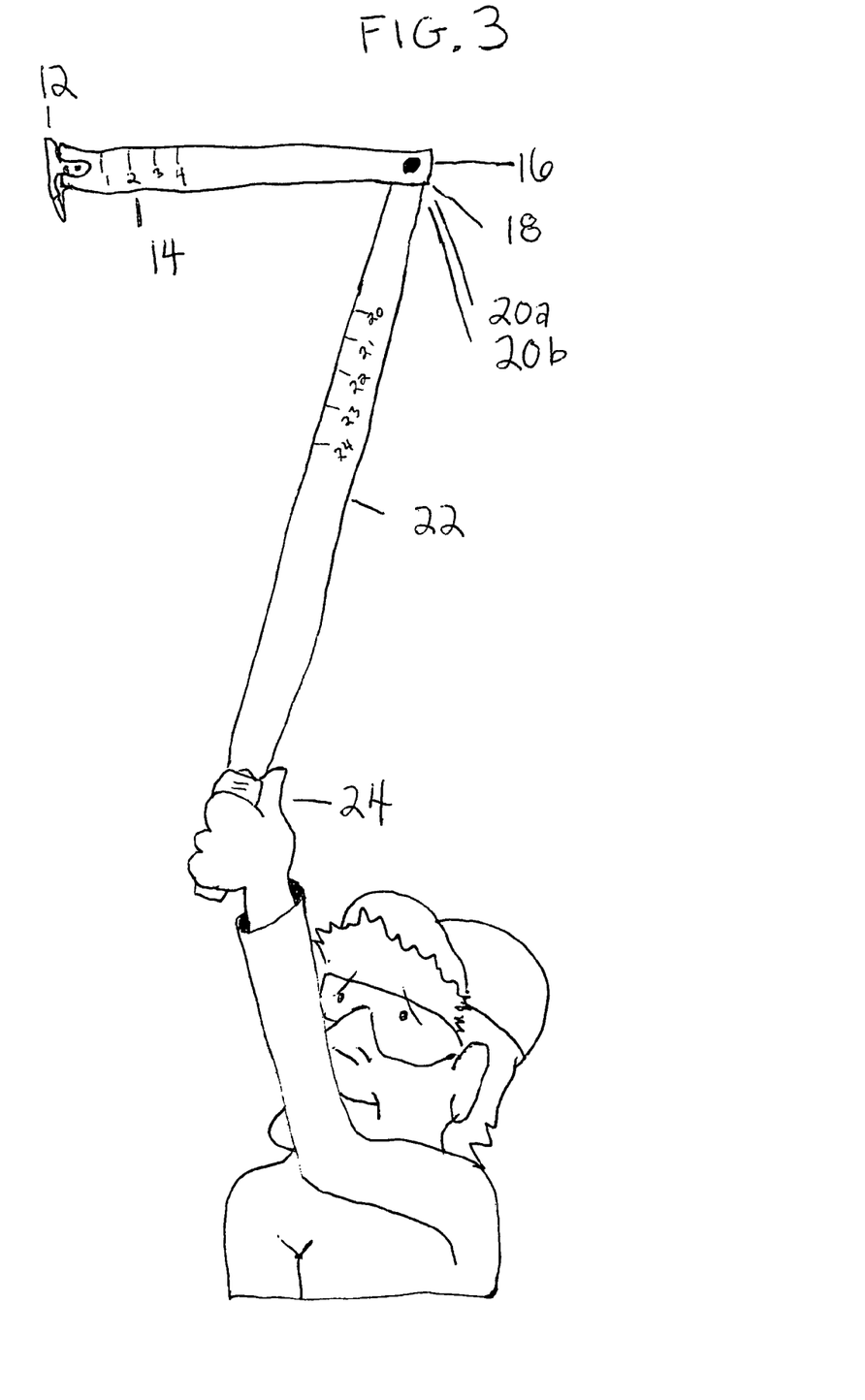
FIG. 3 is a front perspective of the preferred embodiment. A hinged tape measure in use on a ceiling corner horizontal measure. From front tip 12 to back tip 18 the tape is self supporting horizontally several feet overhead.

FIGS. 1, 2, and 3 are perspectives of the basic version of our hinged tape measure invention. Front tip 12 starts at zero inches and the beginning of the tape measure. Tip measure 14 is the section (s) made from pivot (s) 16. Back tip 18 is the rear or end measurement of tip measure 14. Angle hold 20 is a circle of bumps or ridges and indents that surround the inside of pivot 16 and face each other. Base measure 22 is the part of the tape that is wound into housing 24 first and comes out last.

Figure 4:
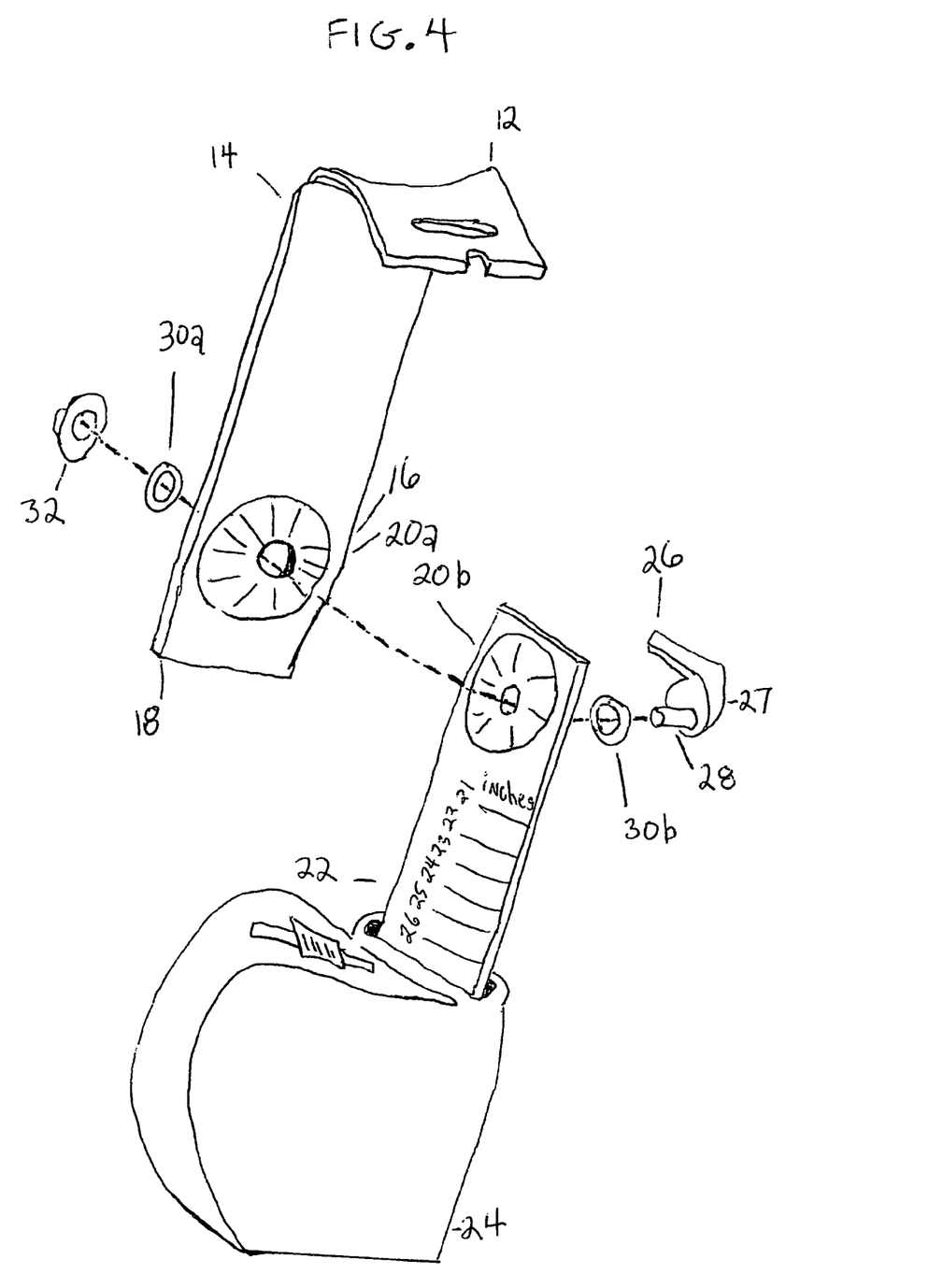
FIG. 4 is an exploded view of the preferred embodiment and the alternative of a wedge lock lever attached to bolt 28.

FIG. 4 is an exploded perspective view of basic version. Angle hold 20*a* and 20*b* are visible, facing and touching each other at pivot 16. In this drawing an alternate embodiment of the lock 26 comprises of wedge 27 and is added or attached to bolt 28. Bolt 28 will pass through washer 30*a* and 30*b*. Connecting tip measure 14 section (s) together at pivot (s) 16 with pressure and a rivet cap 32.

Figure 5:
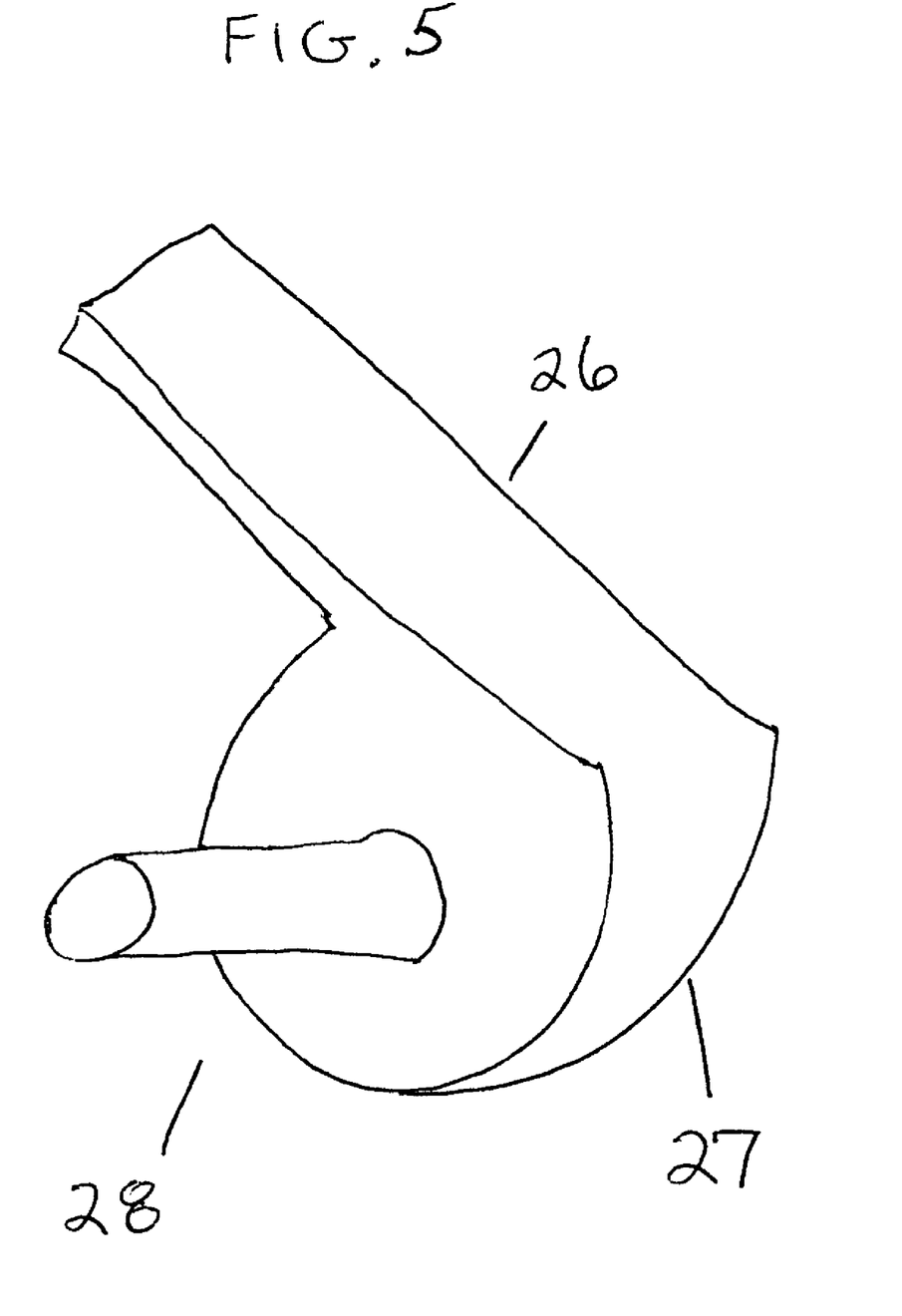
FIG. 5 shows a perspective close view of the lock lever 26 attached to bolt 28
Figure 6:
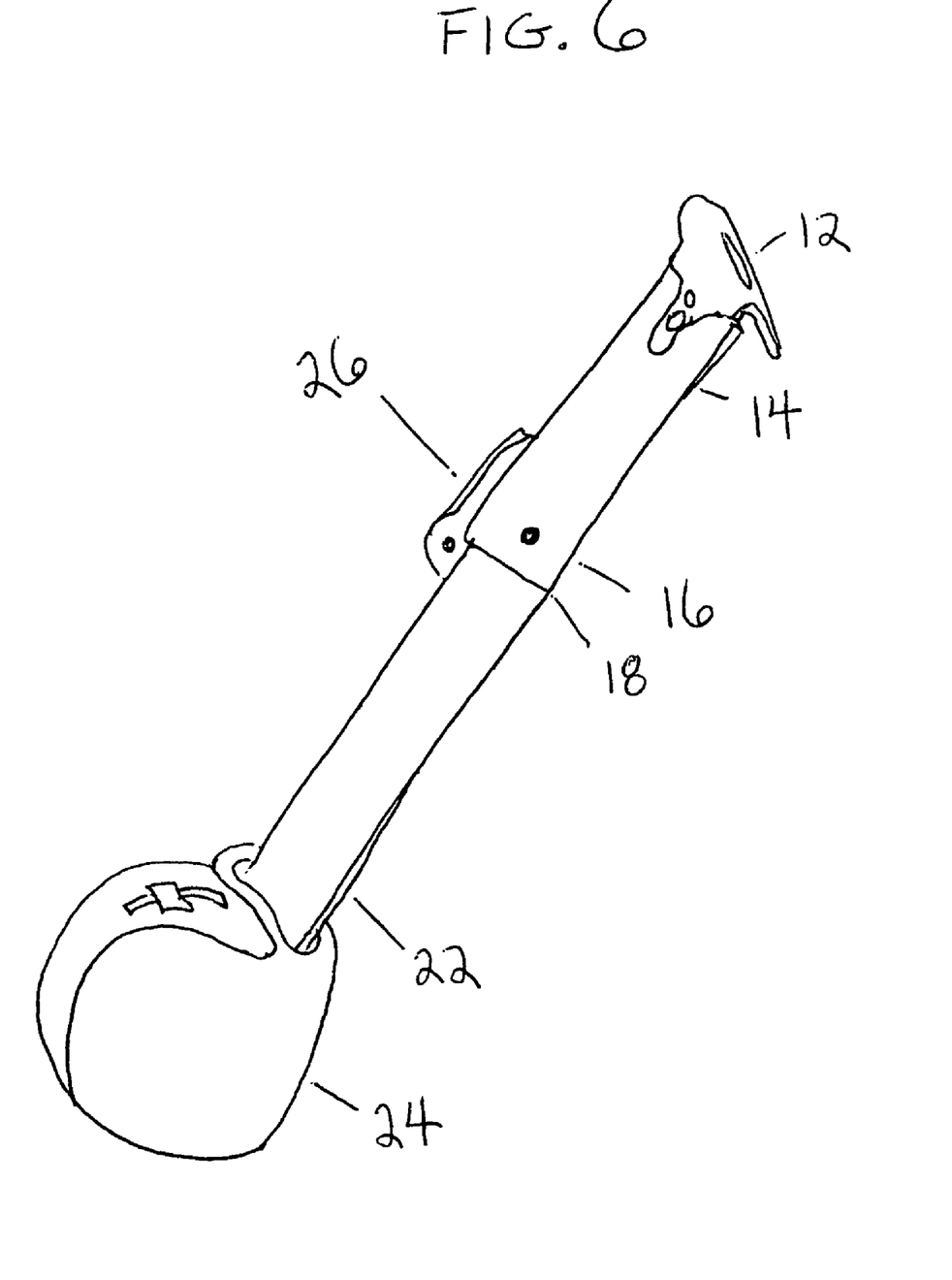
FIG. 6 shows a front perspective of the tape measure and pivot (s) 16 is in the straight position and held by lever lock 26.
Figure 7:
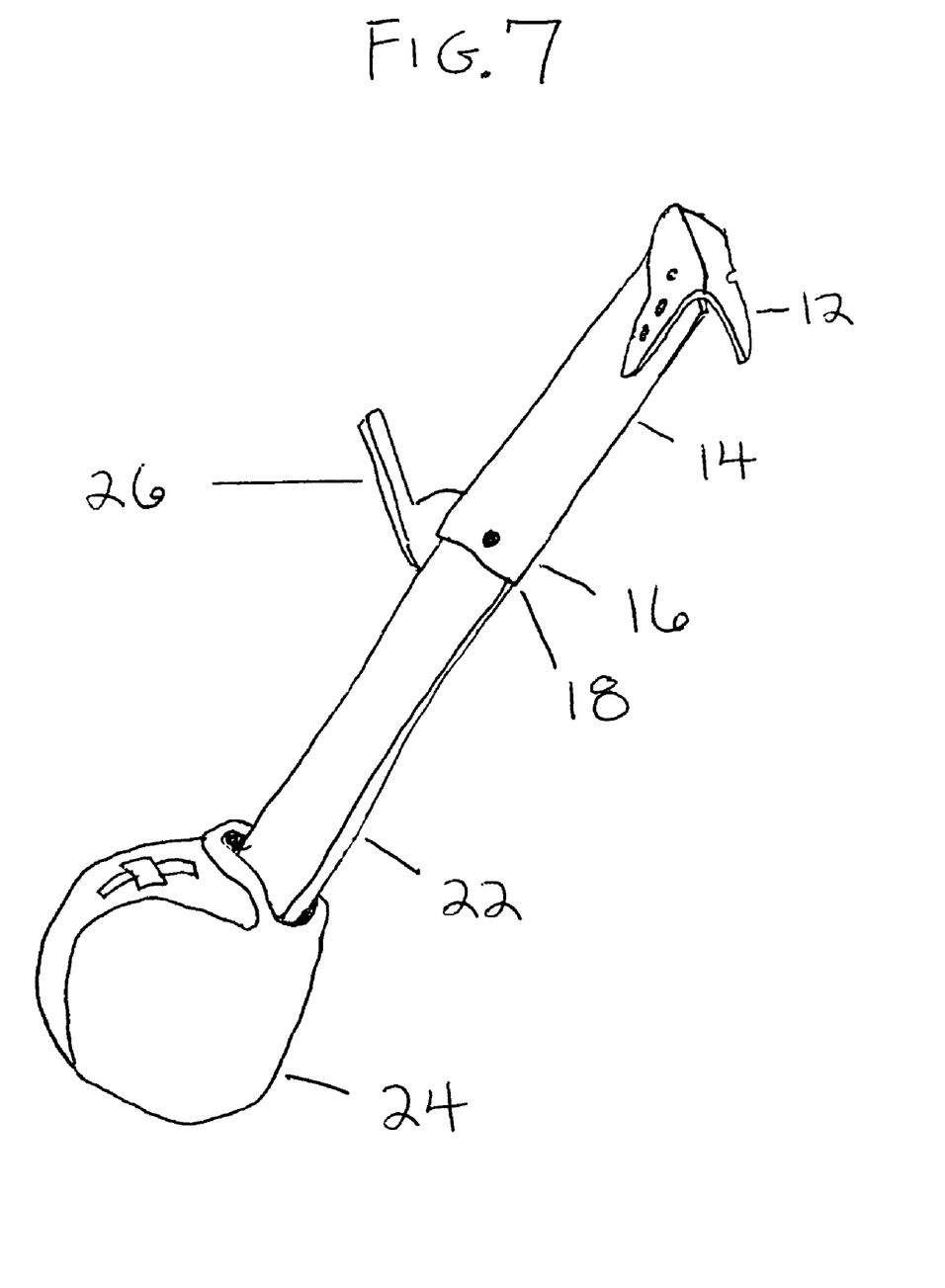
FIG. 7 is a perspective of lock lever 26 in the open position allowing pivot 16 to move in any direction.
Figure 8:
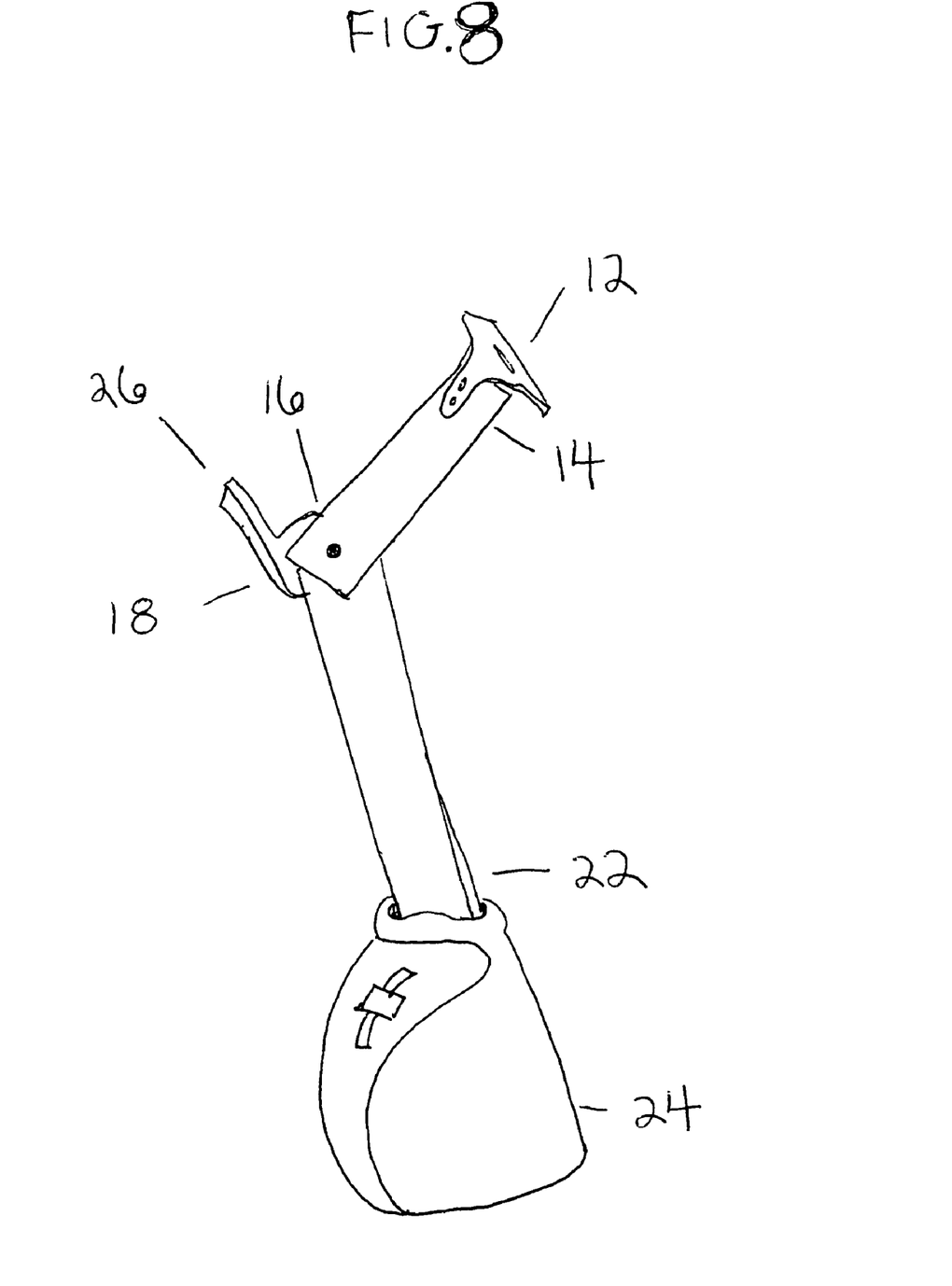
FIG. 8 is a perspective of tape moved to an angle and ready for lock lever 26 to be set or closed.
Figure 9:
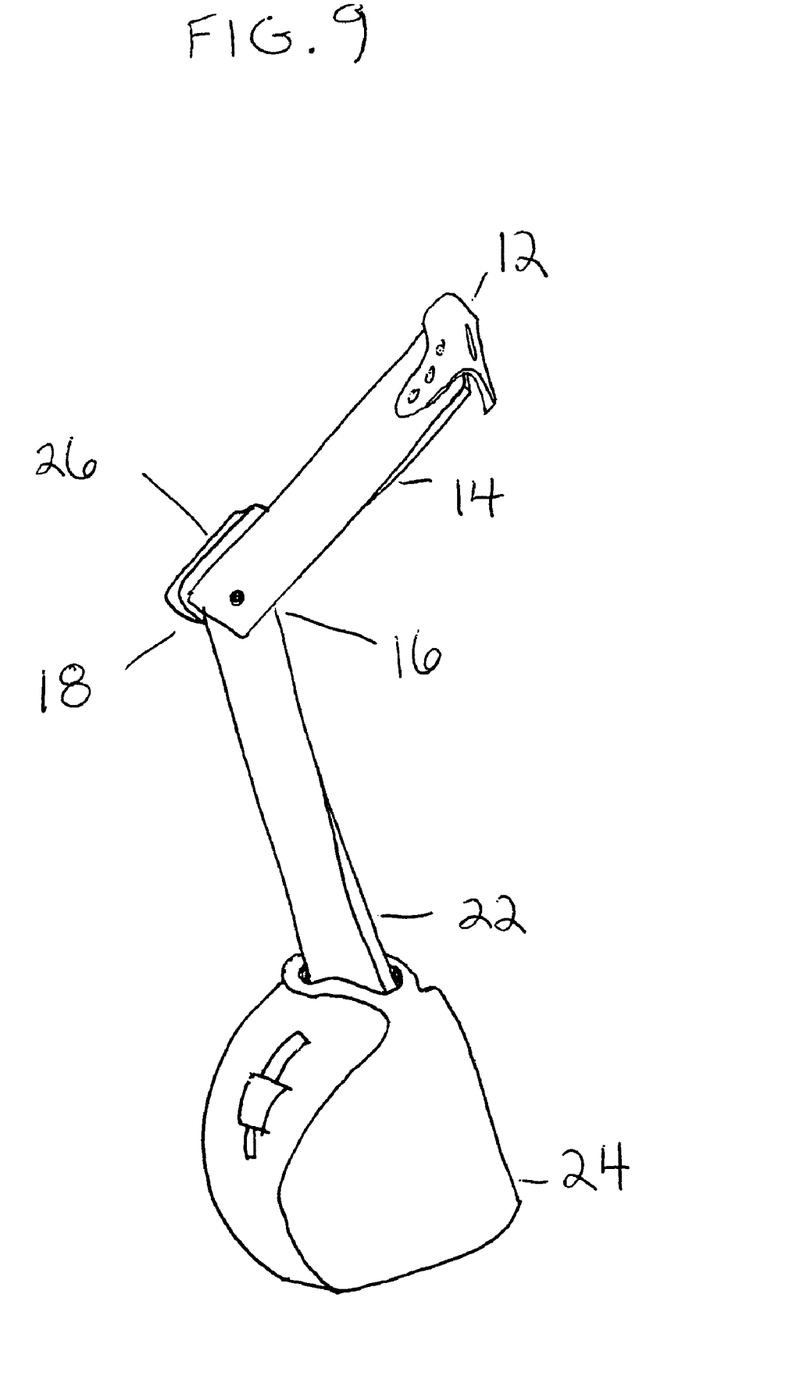
FIG. 9 is a perspective of tape measure at an angle and lock lever 26 is locked or in closed position.

FIG. 5 is a perspective of a close view of lock 26 using a wedge 27 added and attached to bolt 28.

FIGS. 6, 7, 8, 9 illustrate step by step action of lock 26

Figure 10:
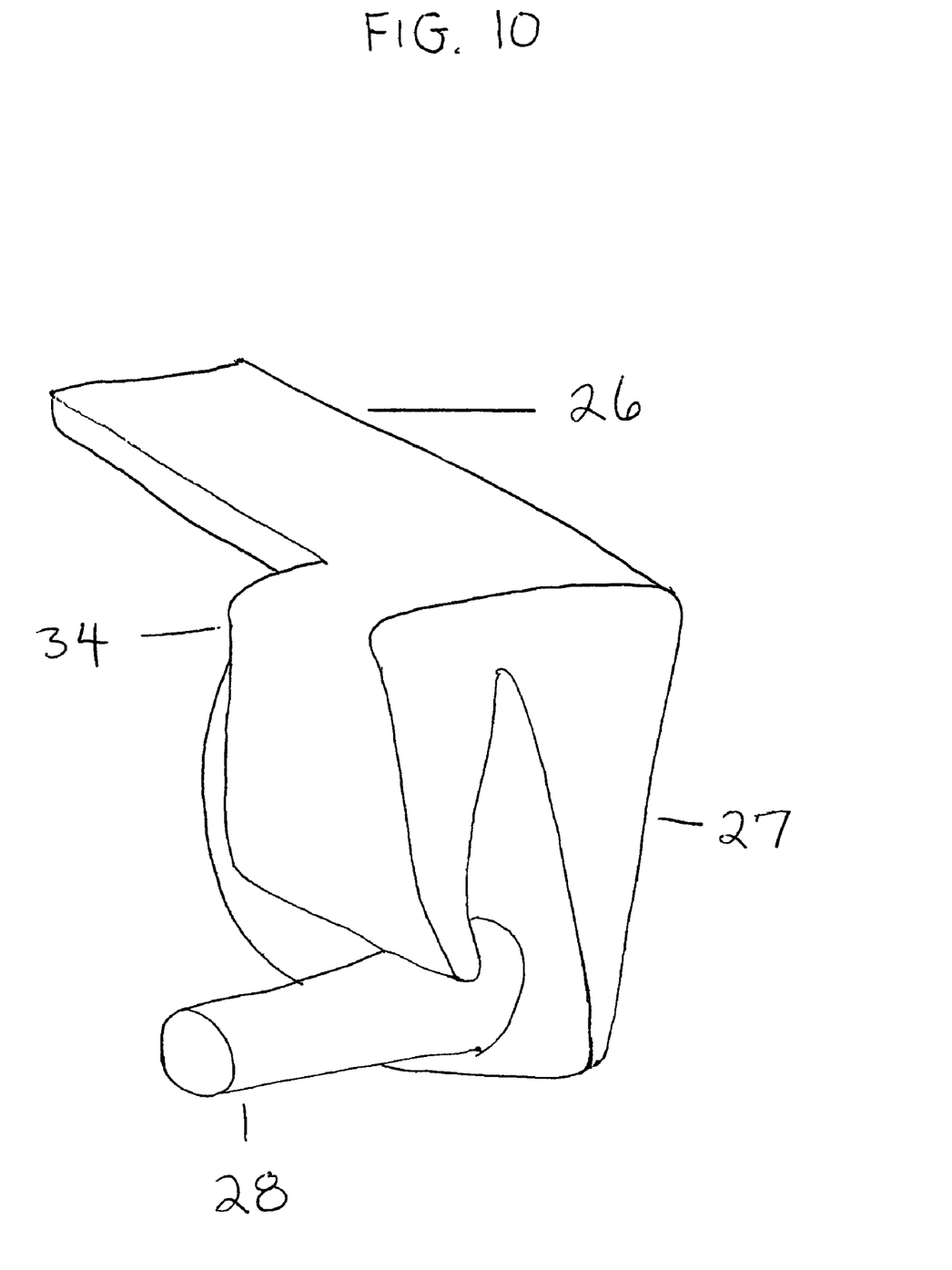
FIG. 10 is a perspective of lock lever 26 with a pinch 34 added and across from top and thick part of the wedge 27.

FIG. 10 is a perspective of lock 26 and wedge 27 and a pinch is attached at the thick and across from wedge 27.

Figure 11:
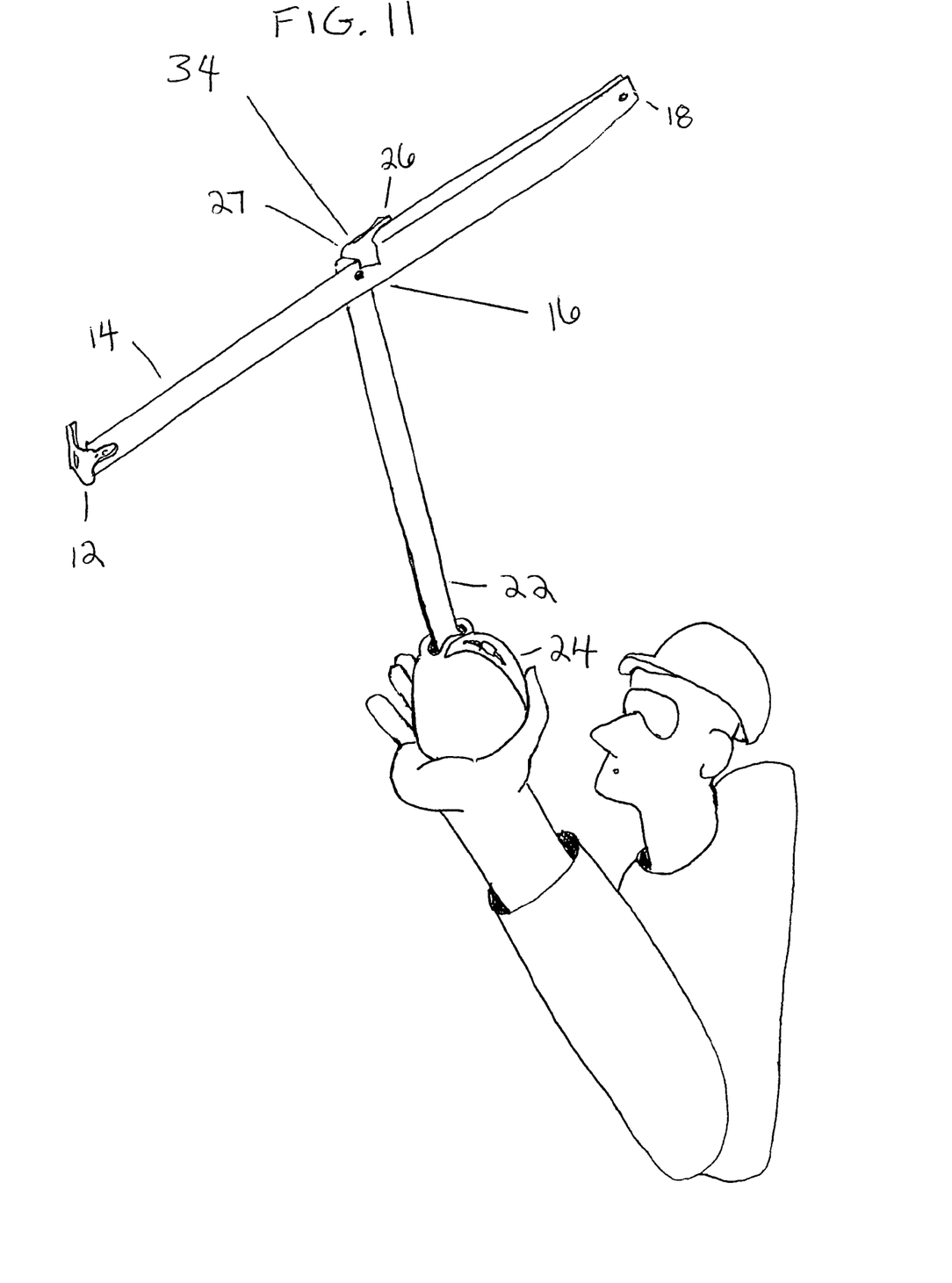
FIG. 11 is a perspective of a tee position of the tape measure for longer horizontal out of reach measuring. The pinch 34 is holding two sections of tape measure enabling the tee formation.

FIG. 11 shows a front perspective of lock 26, wedge 27, and pinch 34 holding tape measure at intersection of tee shape position for greater length self supporting out of reach horizontal measuring.

OPERATION OF INVENTION

FIGS. 1, 2, 3 show perspective of tape measure with a pivot(s) 16. Showing the ability of the using to get an accurate and quick out of reach horizontal measurement. The angle hold 20 keeps the tip measure 14 in the needed position. Many measurements may be made quickly and safely with this addition to the tape measure.

FIG. 4 shows an exploded perspective of the tip measures 14 and base measure 22 at pivots 16. The ridges or bumps and indents of angle hold 20*a* and 20*b* are viewable. Alternative lock lever 26 and wedge 27 may be attached and or added to bolt 28. Bolt 28 passes through washer 30*a* and 30*b* and through pivot (s) 16 and are connected together with rivet cap 32. The preferred embodiment is connected with only pressure bolt 28 to rivet cap 32. The ridges in the opposing faces of angle hold 20*a* and 20*b* will be able to hold tip measure 14 in a horizontal position for short lengths of measure and simple shapes. The pivots 16 will still be able to move under just the right amount of connected pressure. The alternate embodiment discussed below of lock 26 and wedge 27, will increase the length and many shapes of a user of our invention for the tape measure.

DESCRIPTION AND OPERATION OF ALTERNATE EMBODIMENTS

FIG. 5 is a close view perspective of the lock 26 and wedge 27 attached and or added to bolt 28. This is just one example of many different kinds of a micro locking systems that will used and or attached to bolt 28. As the lock lever 26 is pushed into the closed position wedge 27 tightly sandwiches tip measure 14, angle hold 20*a* and 20*b*, and base measure 22 together. The result is a tape measure with the tip measure 14 held at any predetermined angle. For example, the tip measure 14 is perpendicular to the base measure 22 for one type of horizontal measuring.

FIGS. 6, 7, 8, and 9 illustrate step by step action of lock 26. Opening lock 26 releasing wedge 27 pressure. Closing lever lock 26 applies wedge 27. Pivot 16 allows free range of movement of tip measure 14 back and forth around base measure 22. Angle hold 20*a* and 20*b* provide grip for the lock 26 and wedge 27 on the pivot (s) 16 area (s).

FIG. 10 shows the lock 26, wedge 27, bolt 28 with an added pinch 34 across from the top of lock 26 at the thickest part of wedge 27.

FIG. 11 shows a front perspective of lock 26, wedge 27, and pinch 34 holding tape measure in tee shape position for greater length self supporting out of reach horizontal measuring. You can only go in a horizontal plane a certain length in one direction with tip measure 14 until base measure 22 collapses from side pressure. If you pivot the tape at 8 feet back to center to twelve feet pivot the tape will be in the shape of a balanced letter T (tee). As the lock 26 is closed the pinch 34 will hold tape measure at the tee intersection. The base measure 22 will be raised for an eight feet or less range of measure overhead.

CONCLUSION, RAMIFICATIONS, AND SCOPE OF INVENTION

Thus the reader will see that the invention provides efficient, reliable, and unique addition to the tape measure. The invention increases safety and speed of a job in the end saving money. While our above description contains many specificities, these should not be construed as limitations on the scope of the invention, but rather as an exemplification of one preferred embodiment thereof.

Many other variations are possible. For example but not limited to, a multi-hinged or pivoting tape measures with pivots making sections at 1, 2, 4, 8, and twelve feet. The ability of our invention to be locked at the pivot (s) or hinged point (s). increases the range and strength of the tape measure. The method of making a balanced tee out of the tape measure and the pivoting sections. This method and alternate embodiment allows for longer overhead and or out of reach horizontal measuring. Accordingly, the scope of our invention should be determined not by the embodiments illustrated but by the appended claims and their legal equivalents.

We claim:

1. A combination retractable tape measure assembly with folding or pivoting front sections comprising a housing assembly;
    a reel rotatably mounted in said housing assembly;
    an elongated blade formed of a ribbon of metal having one end connected to said reel constructed and arranged with respect to said housing assembly to extend from a position tangential to said reel outwardly through a spaced opening in said housing assembly;
    and a free end of the blade comprises a plurality of folding sections having length indicating indicia thereon, including a first end section and second end section and a plurality of similar sections, sections being made of the same metal ribbon and comprising of a first hole disposed toward a first end thereof and a second hole disposed toward a second opposite end thereof;
    the sections pivotally connected together at respective pivot joints via a plurality of posts each extending through the first hole of one of the plurality of sections and the second hole of an adjacent section of the plurality of sections;
    wherein the sections forming at each pivot joint are biased toward one another; the sections pivotally moveable between a collapsed configuration wherein the sections are stacked and an extended configuration wherein the sections are linearly aligned along a measurement axis, wherein at least one section rotates by any degree or angle with respects to an adjacent section to move between the collapsed configuration and the extended configuration;
    the sections each further comprising a plurality of protrusions extending normal to the measurement axis and disposed proximate the first hole and a plurality of recesses extending normal to the measurement axis and disposed proximate the second hole;
    wherein the protrusions and the recesses are complementarily formed;
    a locking system comprising a lever provided adjacent at least one of the pivot joints which positively holds a desired angle between sections with a pinching pressure;
    a coil spring formed of a ribbon or blade of metal having a construction and arrangement between said housing assembly and said reel to rotate said reel in said housing assembly in a direction to wind up the elongated blade when extending outwardly of said housing assembly opening in a normal concavo-convex cross-sectional configuration onto said reel in a abutting volute coil formation in a flattened cross-sectional configuration;
    and a blade holding assembly constructed and arranged to be manually actuated to hold the blade in any position of extension outwardly of said housing assembly opening and to release the blade from any position in which the blade is held.

2. A combination retractable tape measure assembly with folding or pivoting front sections as defined in claim 1 wherein said housing assembly includes a pair of cooperating housing members, each including an end wall having a peripheral wall extending from a periphery thereof and terminating in a free edge, said housing members being fixed together with their free edges interrogated by a plurality of bolts extending through one of said housing members and threadedly engaged in the other at spaced positions adjacent the peripherl walls thereof and by a fixed reel spindle having a non-circular interrogating recess-projection connection at each end thereof with the central interior of the adjacent end wall, each end of said spindle being interiorly threaded to threadedly receive a bolt therein extending through a central hole in the adjacent end wall and the recess-projection connection between the central hole and threaded interior.

3. A combination retractable tape measure assembly with folding or pivoting front sections as defined in claim 2 comprising said blade having an end hook member on the end thereof, said end hook member being formed of sheet metal of a predetermined thickness to include a concavo-convex mounting portion having a u-shaped hook portion bent at a generally right angle from an end thereof, said end hook member being mounted on the free end of said blade with the mounting portion thereof secured in limited sliding engagement with a concave side of the free end of said blade so that said rule can be measured externally from an exterior surface of said u-shaped hook portion or internally from an interior surface of said u-shaped hook portion, said u-shaped hook portion including a bight section extending transversely from a convex side of the free end of said blade and spaced leg sections extending beyond transversely spaced corners of the free end of said blade.

\* \* \* \* \*